United States Patent [19]
van der Weide

[11] Patent Number: 5,936,237
[45] Date of Patent: Aug. 10, 1999

[54] COMBINED TOPOGRAPHY AND ELECTROMAGNETIC FIELD SCANNING PROBE MICROSCOPE

[76] Inventor: Daniel Warren van der Weide, 53 Ritter La., Newark, Del. 19711-5174

[21] Appl. No.: 08/846,284

[22] Filed: Apr. 30, 1997

Related U.S. Application Data

[60] Provisional application No. 60/000,782, Jul. 5, 1995.
[51] Int. Cl.$^6$ ...................................................... G01B 5/28
[52] U.S. Cl. .............................. 250/234; 250/306; 73/105
[58] Field of Search .................................. 250/234, 306, 250/341.2, 307; 73/105

[56] References Cited

U.S. PATENT DOCUMENTS

| | | | |
|---|---|---|---|
| 4,343,993 | 8/1982 | Binnig et al. | 350/306 |
| 4,994,818 | 2/1991 | Keilmann . | |
| 5,345,815 | 9/1994 | Albrecht et al. | 73/105 |
| 5,354,985 | 10/1994 | Quate . | |
| 5,393,647 | 2/1995 | Neukermans et al. . | |
| 5,442,300 | 8/1995 | Nees et al. . | |
| 5,489,774 | 2/1996 | Akamine et al. . | |
| 5,509,300 | 4/1996 | Chamberlin et al. | 73/105 |
| 5,519,212 | 5/1996 | Elings et al. | 250/234 |
| 5,570,336 | 10/1996 | Inui et al. | 364/126 |
| 5,581,082 | 12/1996 | Hansma et al. . | |
| 5,581,083 | 12/1996 | Majumdar et al. | 250/306 |
| 5,619,139 | 4/1997 | Holczer et al. | 324/318 |
| 5,770,856 | 6/1998 | Fillard et al. | 250/234 |

OTHER PUBLICATIONS

Ash, E. A. and G. Nichols (1972). "Super–resolution aperture scanning microscope." *Nature* 237: 510–12.

Balk, L. J., P. Koschinski, et al. (1995). Nano and micro characterization of III–V–compound material by dedicated scanning microscopy. *Proceedings of the Symposium on Nondestructive Wafer Characterization for Compound Semiconductor Materials and the Twenty–Second State–of–the–Art Program on Compound Semiconductors (SOTAPOCS XXII).* V. Malhotra, V. Swaminathan, S. N. G. Chu et al. Pennington, NJ, USA, Elctrochem. Soc: 39–54.

(List continued on next page.)

*Primary Examiner*—Edward P. Westin
*Assistant Examiner*—Thanh X. Luu

[57] ABSTRACT

A combined near-zone electromagnetic field and topography probe based on a scanning-probe microscope (SPM). One or a plurality of sub-wavelength electromagnetic antennas and waveguides are integrated with tip-cantilever assemblies commonly used in scanning probe microscopy, combining the contact- or non-contact-mode tip-sample distance control and topography-sensing capacity of the SPM with the ability to measure or excite local electromagnetic fields on the sample. A wide range of topography-sensing forces acting on the tip-cantilever assembly can be employed, such as capillary, van der Waals, electrostatic and magnetic. Simultaneous measurement and/or excitation of electromagnetic fields in the frequency range from near zero to tens of THz can be performed, limited only by the design and ability of the antenna and waveguide material(s) to localize and guide the electromagnetic energy, and by suitable means for energy detection and/or generation connected to the waveguide. In one embodiment, the topography probe tip also acts as the center conductor of a tapered coaxial tip which is connected to a shielded transmission line waveguide running the length of the cantilever to a coaxial cable feeding an oscilloscope. In another embodiment, the coaxial tip is replaced by a magnetic-field loop antenna or electric-field gap antenna.

28 Claims, 15 Drawing Sheets

OTHER PUBLICATIONS

Blanc, N., J. Brugger, et al. (1996). "Scanning force microscopy in the dynamic mode using microfabricated capacitive sensors." *Journal of Vacuum Science & Technology B (Microelectronics and Nanometer Structures)* 14(2): 901–5.

Chevalier, B., M. Chatard–Moulin, et al. (1992). "High temperature complex permittivity measurements of composite materials using an open–ended waveguide." *Journal of Electromagnetic Waves and Applications* 6(9): 1259–75.

Danzebrink, H. U., G. Wilkening, et al. (1995). "Near–field optoelectronic detector probes based on standard scanning force cantilevers." *Applied Physics Letters* 67(14): 1981–3.

Davis, R. C., C. C. Williams, et al. (1995). "Micromachined submicrometer photodiode for scanning probe microscopy." *Applied Physics Letters* 66(18): 2309–11.

Dürig, U., D. Pohl, et al. (1986). "Near–field optical scanning microscopy with tunnel–distance regulation." *IBM J. Res. Develop.* 30(5): 478–83.

Fee, M., S. Chu, et al. (1989). "Scanning electromagnetic transmission line microscope with sub–wavelength resolution." *Optics Communications* 69(3–4): 219–24.

Golosovsky, M., A. Galkin, et al. (1996). "High–spatial resolution resistivity mapping of large–area YBCO films by a near–field milimeter–wave microscope." *IEEE Transactions on Microwave Theory and Techniques* 44(7, pt.2): 1390–2.

Hou, A. S., F. Ho, et al. (1992). "Picosecond electrical sampling using a scanning force microscope." *Electronics Letters* 28(25): 2302–3.

Indermühle, P.–F., G. Schürmann, et al. (1997). "Self–sharpening tip integrated on micro cantilevers with self–exciting piezoelectric sensor for parallel atomic force microscopy." *Applied Physics Letters* 70(17): 2318–20.

Jiang, G. Q., W. H. Wong, et al. (1993). "Measurement of the microwave dielectric constant for low–loss samples with finite thickness using open–ended coaxial–line probes." *Review of Scientific Instruments* 64(6):1622–6.

Jiang, G. Q., W. H. Wong, et al. (1993). "Open–ended coaxial–line technique for the measurement of the microwave dielectric constant for low–loss solids and liquids." *Review of Scientific Instruments* 64(6): 1614–21.

Keilmann, F. (1995). "FIR microscopy." *Infrared Physics & Technology* 36(1): 217–24.

Keilmann, F., D. W. van der Weide, et al. (1996). "Extreme sub–wavelength resolution with a scanning radio–frequency transmission microscope." *Optics Communications* 129(1–2):15–18.

Lewis, A., U. Ben–Ami, et al. (1995). "NSOM the fourth dimension: integrating nanometric spatial and femtosecond time resolution." *Scanning* 17(1): 3–13.

Lieberman, K., A. Lewis, et al. (1994). "Multifunctional, micropipette based force cantilevers for scanned probe microscopy." *Applied Physics Letters* 65(5): 648–50.

McCutchen, C. W. (1995). "Transmission line probes for scanning photon–tunneling microscopy." *Scanning* 17(1):15–17.

Mihalcea, C., A. W. Scholz, et al. (1996). "Multipurpose sensor tips for scanning near–field microscopy." *Applied Physics Letters* 68(25): 3531–3.

Misra, D., M. Chabbra, et al. (1990). "Noninvasive electrical characterization of materials at microwave frequencies using an open–ended coaxial line: test of an improved calibration technique." *IEEE Transactions on Microwave Theory and Techniques* 38(1): 8–14.

Moers, M. H. P., R. G. Tack, et al. (1994). "Photon scanning tunneling microscope in combination with a force microscope." *Journal of Applied Physics* 75(3): 1254–7.

Moussessian, A. and D. B. Rutledge (1992). A millimeter–wave slot–V antenna. *IEEE Antennas and Propagation Society International Symposium. 1992 Digest. Held in Conjuction with: URSI Radio Science Meeting and Nuclear EMP Meeting (Cat. No. 92CH3178–1)*. New York, NY, USA, IEEE. 4: 1894–7.

Noell, W., M. Abraham, et al. (1997). "Micromachined aperture probe tip for multifunctional scanning probe microscopy." *Applied Physics Letters* 70(10): 1236–38.

Osofsky, S. S. and S. E. Schwarz (1992). "Design and performance of a noncontacting probe for measurements on high–frequency planar circuits." *IEEE Transactions on Microwave Theory and Techniques* 40(8): 1701–8.

Radmacher, M., A. P. E. Hillner, et al. (1994). "Scanning nearfield optical microscope using microfabricated probes." *Review of Scientific Instruments* 65(8): 2737–8.

Rugar, D. and P. Hansma (1990). "Atomic force microscopy." *Physics Today* (Oct.): 23–30.

Ruiter, A. G. T., M. H. P. Moers, et al. (1996). "Microfabrication of near–field optical probes." *Journal of Vacuum Science & Technology B (Microelectronics and Nanometer Structures)* 14(2): 597–601.

Rutledge, D. B., S. E. Schwarz, et al. (1978). "Infrared and submillimeter antennas. " *Infrared Physics* 18: 713–29.

Toledo–Crow, R., P. C. Yang, et al. (1992). "Near–field differential scanning optical microscope with atomic force regulation." *Applied Physics Letters* 60(24): 2957–9.

Tortonese, M., R. C. Barret, et al. (1993). *Applied Physics Letters* 62: 834–36.

Van Der Weide, D. W. (1994). "Planar antennas for all–electronic terahertz systems." *Journal of the Optical Society of America B (Optical Physics)* 11(12): 2553–60.

Van Der Weide, D. W. (1997). "Localized picosecond resolution with a near–field microwave/scanning–force microscope." *Applied Physics Letters* 70(6): 677–79.

Van Der Weide, D. W. and P. Neuzil (1996). "The nanosciloscope: Combined topography and AC field probing with a micromachined tip." *Journal of Vacuum Science & Technology B (Microelectronics and Nanometer Structures)* 14(6): 4144–7.

Vlahacos, C. P., R. C. Black, et al. (1996). "Near–field scanning microwave microscope with 100 mu m resolution." *Applied Physics Letters* 69(21): 3272–4.

Wei, T., X. D. Xiang, et al. (1996). "Scanning tip microwave near–field microscope." *Applied Physics Letters* 68(24): 3506–8.

Wilke, I., W. Herrmann, et al. (1994). "Integrated nanostrip dipole antennas for coherent 30 THz infrared radiation." *Applied Physics B (Lasers and Optics)* B58(2): 87–95.

Xu, Y., F. M. Ghannouchi, et al. (1992). "Theoretical and experimental study of measurement of microwave permittivity using open ended elliptical coaxial probes." *IEEE Transactions on Microwave Theory and Techniques* 40(1): 143–50.

COMBINED TOPOGRAPHY AND ELECTROMAGNETIC FIELD SCANNING PROBE MICROSCOPE

CROSS REFERENCE TO RELATED APPLICATIONS

The invention of this application is an improvement upon the invention of my provisional application Ser. No. 60/000,782, filed Jul. 5, 1995 abandoned.

STATEMENT REGARDING FEDERALLY-SPONSORED RESEARCH/DEVELOPMENT

This invention was made in part with government support under Grant Number N00014-96-1-0862, awarded by the U.S. Office of Naval Research. The United States Government has certain rights in this invention.

BACKGROUND

1. Field of Invention

This invention relates to scanned-probe microscopy, specifically to a means of locally exciting or detecting sub-visible electromagnetic fields while measuring or altering sample topography simultaneously or alternatively, using a combined scanning probe microscope (SPM) tip and electromagnetic waveguide structure integrated with the cantilever of the SPM.

2. Description of Prior Art

Near-field scanning optical microscopy (NSOM) is a technique by which visible or near-visible radiation (free-space wavelength generally less than one micrometer) is confined within a sub-wavelength-diameter aperture for localized excitation of a sample or for localized detection of electromagnetic phenomena in this wavelength regime. The principle of NSOM, namely obtaining sub-wavelength resolution in excitation or detection, is quite general, and need not be restricted to visible radiation, as was already demonstrated in Ash and Nichols, "Super-resolution aperture scanning microscope," Nature, 237 510–12 (1972) using 3-cm wavelength microwave radiation confined to a sub-wavelength aperture to achieve 1/60 wavelength-relative resolution in scanning across a sample.

Scanning probe microscopy (SPM), on the other hand, is a well-known means of characterizing the topography of a sample by scanning a sharp tip mounted on a flexible cantilever over the sample while recording a quantity such as cantilever deflection in response to local forces or a current during tunneling between tip and sample. The feedback mechanism common to all SPM implementations offers a very important benefit in maintaining a precise tip-sample distance control operating in a variety of modes, known in force microscopy as "contact", "non-contact", "periodic-contact", and "near-contact" modes. Of particular interest to the present invention is the variety of non-contact force microscopy modes in which the tip/cantilever assembly is vibrated at its resonant frequency and the change in this frequency due to surface force (e.g. electrostatic, van der Waals, or magnetic) gradients of the sample is detected and used as a feedback mechanism, allowing the tip to scan above the sample at a distance of 5 to 500 Angstroms. Several detection mechanisms with sub-Angstrom sensitivity for cantilever deflection exist, such as optical beam deflection, interferometry, piezoresistivity, changes in capacitance between the cantilever and a fixed plate, and vacuum tunneling, all described in U.S. Pat. No. 5,354,985 to Quate and in U.S. Pat. No. 5,489,774 to Akamine et al., as well as in Blanc, Brugger et al., "Scanning force microscopy in the dynamic mode using microfabricated capacitive sensors," Journal of Vacuum Science & Technology B (Microelectronics and Nanometer Structures), 14 901–5 (1996), all incorporated herein by reference. The feedback technique combined with the mechanical resonance limitations of the SFM cantilever usually limits the frequency response of the system to below 100 kHz. While there are few dynamic phenomena of interest at frequencies below 100 kHz, significant prior art exists for combining the benefits of the SFM and the visible-light NSOM, such as that in U.S. Pat. No. 5,354,985 to Quate and in U.S. Pat. No. 5,489,774 to Akamine et al., but again these inventions locally detect or excite only visible or near-visible light.

There is, however, a large class of electromagnetic phenomena having characteristic frequencies lying between the extremes of frequency described above, such as integrated-circuit (IC) electromagnetic fields (generally between 1 MHz and 100 GHz, herein termed "microwaves"), biological-membrane contrast mechanisms (primarily due to absorption of radiation by water in the range of 100 GHz to 30 THz or 10 micrometer wavelengths), molecular rotational absorptions (also primarily in the 100 GHz to 30 THz range, herein termed "FIR" for "far infrared"), and responses of material properties in the range of 1 MHz to 30 THz.

There has been prior work in the field of sub-visible microscopy. U.S. Pat. No. 4,994,818 to Keilmann and Fee, Chu et al., "Scanning electromagnetic transmission line microscope with sub-wavelength resolution," Optics Communications, 69 219–24 (1989) and Keilmann, "FIR microscopy," Infrared Physics & Technology, 36 217–24 (1995), all incorporated herein by reference, teach a scanning coaxial tip for focusing radiation. In this work, the advantages of a coaxial tip for shielding and for localizing the tip/sample interaction or stimulus/response are set forth, and the extreme sub-wavelength resolution of the coaxial tip is anticipated. There is, however, no integration of an SPM (and its associated probe positioning and topography-measuring advantages) with the coaxial tip being taught.

None of the prior art in NSOM as taught by Dürig, Pohl et al., "Near-field optical scanning microscopy with tunnel-distance regulation," IBM J. Res. Develop., 30 478–83 (1986); Toledo-Crow, Yang et al., "Near-field differential scanning optical microscope with atomic force regulation," Applied Physics Letters, 60 2957–9 (1992); Lieberman, Lewis et al., "Multifunctional, micropipette based force cantilevers for scanned probe microscopy," Applied Physics Letters, 65 648–50 (1994); Moers, Tack et al., "Photon scanning tunneling microscope in combination with a force microscope," Journal of Applied Physics, 75 1254–7 (1994); Radmacher, Hillner et al., "Scanning nearfield optical microscope using microfabricated probes," Review of Scientific Instruments, 65 2737–8 (1994); Danzebrink, Wilkening et al., "Near-field optoelectronic detector probes based on standard scanning force cantilevers," Applied Physics Letters, 67 1981–3 (1995); Davis, Williams et al., "Micromachined submicrometer photodiode for scanning probe microscopy," Applied Physics Letters, 66 2309–11 (1995); Lewis, Ben-Ami et al., "NSOM the fourth dimension: integrating nanometric spatial and femtosecond time resolution," Scanning, 17 3–13 (1995); McCutchen, "Transmission line probes for scanning photon-tunneling microscopy," Scanning, 17 15–17 (1995); Mihalcea, Scholz et al., "Multipurpose sensor tips for scanning near-field microscopy," Applied Physics Letters, 68 3531–3 (1996); Ruiter, Moers et al., "Microfabrication of near-field optical probes," Journal of Vacuum Science & Technology B (Microelectronics and Nanometer Structures), 14 597–601 (1996); Noell, Abraham et al., "Micromachined aperture probe tip for multifunctional scanning probe microscopy," Applied Physics Letters, 70 1236–38 (1997), deals with sub-visible radiation, although in many of these works, the advantages of simultaneous tip-sample distance regulation, topography sensing and scanning optical microscopy were recognized.

Much prior art exists describing larger-scale field probes used for sensing radiation from an object and for measuring local material properties, as exemplified in Misra, Chabbra et al., "Noninvasive electrical characterization of materials at microwave frequencies using an openended coaxial line: test of an improved calibration technique," IEEE Transactions on Microwave Theory and Techniques, 38 8–14 (1990); Chevalier, Chatard-Moulin et al., "High temperature complex permittivity measurements of composite materials using an open-ended waveguide," Journal of Electromagnetic Waves and Applications, 6 1259–75 (1992); Osofsky and Schwarz, "Design and performance of a noncontacting probe for measurements on high-frequency planar circuits," IEEE Transactions on Microwave Theory and Techniques, 40 1701–8 (1992); Xu, Ghannouchi et al., "Theoretical and experimental study of measurement of microwave permittivity using open ended elliptical coaxial probes," IEEE Transactions on Microwave Theory and Techniques, 40 143–50 (1992); Jiang, Wong et al., "Open-ended coaxial-line technique for the measurement of the microwave dielectric constant for low-loss solids and liquids," Review of Scientific Instruments, 64 1614–21 (1993); Jiang, Wong et al., "Measurement of the microwave dielectric constant for low-loss samples with finite thickness using open-ended coaxial-line probes," Review of Scientific Instruments, 64 1622–6 (1993); Keilmann, van der Weide et al., "Extreme sub-wavelength resolution with a scanning radio-frequency transmission microscope," Optics Communications, 129 15–18 (1996); Vlahacos, Black et al., "Near-field scanning microwave microscope with 100 µm resolution," Applied Physics Letters, 69 3272–4 (1996); Wei, Xiang et al., "Scanning tip microwave near-field microscope," Applied Physics Letters, 68 3506–8 (1996), so the use of such waveguide probes is well-known and commonly practiced in the art. None of this work, however, describes combined micro- and sub-micrometer-scale field resolution, nor is there any provision for topographical measurements taught.

There is also prior work in using the SPM for local detection of high frequencies but with a mechanism distinct from that of the present invention. In this prior art, taught by Hou, Ho et al., "Picosecond electrical sampling using a scanning force microscope," Electronics Letters, 28 2302–3 (1992), the dynamic interaction between tip voltage and sample voltage is detected as a difference-frequency product of the two voltages in the displacement of the SPM cantilever, up to its fundamental mechanical resonance, typically 10–100 kHz. While this makes for a relatively fast detection mechanism, it suffers from three significant drawbacks. The first is that, as described in this reference, either topographical information or voltage information is acquired (but not both simultaneously, since they operate using the same signal); when voltage information is being acquired, the control loop which regulates the tip-sample distance must be opened, allowing for drift of this distance and possible loss of calibration. The second is that, by use of a standard SFM tip, the interaction of the voltage on the tip with structures or signals on the sample is significant-there is no electrical shielding of the tip or cantilever taught, unlike in the present invention. Finally, the technique of the prior art is limited to coherent detection, i.e. the voltage signal on the tip must have a common phase with that on the sample so that the (much lower) difference frequency can be detected by the motion of the SFM cantilever. This is a significant drawback which requires expensive instrumentation for generating these coherent measurement signals, and it limits the application largely to probing active electrical circuits, not passive samples.

OBJECTS AND ADVANTAGES OF THE PRESENT INVENTION

The present invention is a unique instrument with several objects and advantages for investigating electromagnetic phenomena in the sub-visible regime. The electric fields detected by this instrument do not propagate through space like radio waves, but rather are closely bound to the region of interest on the sample, hence they are called evanescent waves, and the instrument thus operates in the "near zone" like the NSOM, rather than in the "far zone" as would, for example, a typical radio antenna. Because the strength of these evanescent or near-field waves varies strongly with distance, accurate measurement of these fields requires precise tip-sample distance control, afforded by the SFM feedback mechanism. The combination of this tip-sample distance control and a sub-visible, sub-wavelength near-field antenna for sensing or exciting evanescent waves on the sample is the central novelty of the present invention.

To address the need for probing these phenomena at the local level (i.e. molecular-scale to millimeter scale) the present invention integrates one or a plurality of electromagnetic antennas at or near the topographical probe tip of the SPM tip-cantilever assembly for exciting and/or detecting these fields. A wide variety of such antennas can be co-fabricated with the topography probe, and to this unique combination a number of benefits accrue.

One advantage of the present invention is its ability to independently regulate the tip-sample distance while simultaneously locally stimulating the sample or acquiring local response information from the sample. In this way, the interaction of the tip with the sample can be controlled and regulated in a continuous manner, because the tip-sample distance is normally under the control of the SFM tip positioning electronics, which in the present invention are maintained for this purpose.

Further advantages of the present invention include substantial flexibility in tip design for accommodating different modes of stimulus and response. Examples include but are not limited to electric-field coupling using a coaxial tip, magnetic-field coupling using a microfabricated loop at the tip, and slot-antenna coupling, using a slot or gap antenna for polarization-sensitive measurements. In every embodiment, the electrical signal traveling to or from the tip is decoupled from the conventional SFM topography sensing mechanism because the integrated transmission line allows for direct or heterodyne detection at frequencies well above the mechanical resonance of the cantilever. Furthermore, the present invention functions much like a freely-positionable oscilloscope probe, requiring no a priori knowledge of the phase of the signal on the sample, unlike what is taught by the prior art.

Another advantage of the present invention in contrast with the prior art is that the characteristic impedance Zo of the antenna tip, as well as that of the integrated planar transmission line, can be varied to suit the measurement envisioned. For example, if a 50-ohm generator is to be used, the line spacing of the integrated transmission line and the tip-shield taper spacing of the coaxial tip can be readily designed according to well-known principles to match this generator impedance. On the other hand, if a high-impedance probe is desired, the line spacing and tip-shield taper spacing of the coaxial tip can be adjusted to raise the characteristic impedance of the combined structure.

Another advantage of the present invention over the prior art is the ability to perform not only same-side stimulus/response measurements, but also to arrange sets of two tips to face each other, with the sample situated between them, as described in Keilmann, van der Weide et al., "Extreme sub-wavelength resolution with a scanning radio-frequency transmission microscope," Optics Communications, 129 15–18 (1996). In this arrangement, the sample could be scanned between the tips while one tip would be a source of electrical signals and the other would serve as a detector. Simultaneous topographical information could be acquired during this scan, enabling localized transmission spectroscopy.

Still another advantage of the present invention involves integration of more functionality in the cantilever itself. As discussed in Indermuihle, Schfirmann et al., "Self-sharpening tip integrated on micro cantilevers with self-exciting piezoelectric sensor for parallel atomic force microscopy," Applied Physics Letters, 70 2318–20 (1997) and references therein, incorporated herein by reference, a piezoelectric actuator can be integrated with a scanning force microscope cantilever to enable arrays of independently-controlled cantilevers. This prior art could be combined with the present invention, maintaining the advantages taught by the present invention, namely decoupling of electrical stimulus/response from topographical measurements. Additional functionality which could be integrated with the cantilever in the present invention would be the piezoresistive cantilever taught by Tortonese, Barret et al., Applied Physics Letters, 62 834–36 (1993), incorporated herein by reference, wherein the piezoresistive response of the SFM cantilever is used instead of the usual laser reflection from the back side of the cantilever as a signal to control the tip-sample distance and to acquire topographical information. Such prior art could be incorporated into the present invention while maintaining all the benefits previously described.

SUMMARY OF THE INVENTION

What is disclosed is a unique combination of a sub-wavelength antenna (for frequencies generally below those of visible radiation) and a topography probe, both integrated on the same SPM cantilever. These two functions, stimulus/response of a sample via evanescent-wave coupling and acquisition of topographical information, are decoupled from each other in the present invention, unlike in the prior art of Hou, Ho et al., "Picosecond electrical sampling using a scanning force microscope," Electronics Letters, 28 2302–3 (1992) which teaches a simple and conventional SFM tip/cantilever combination wherein the motion of the cantilever itself is a nonlinear function of the voltage at the tip and the voltage present on the sample. These drawbacks are substantially overcome in the present invention, which can benefit from coherence between the signal on the sample and the detection mechanism, but does not require it.

In the present invention, these drawbacks are substantially overcome because of the unique combination of a sub-wavelength antenna used for evanescent-wave coupling of the signal to or from the tip with the usual SPM cantilever; a waveguide transmission line defined along the cantilever during fabrication in order to allow broadband signals (i.e. from near DC to the lithographic or material limits of single-mode propagation on the line, substantially 30 THz) to travel to or from the tip. This waveguide can feed or be fed from a local stimulus generator or detector situated at the root of the cantilever. Examples of a stimulus generator include but are not limited to a simple oscillator, a pulse generator (such as a nonlinear transmission line or photoconductive switch), or any other means of generating an electrical signal, such as an integrated planar antenna, situated either at the root of the cantilever, along its body, or at the head of the cantilever, near the tip. Examples of a detector include but are not limited to a mixer, a conventional amplifier/diode detector combination, a pre-amplifier driving an external detector (such as an oscilloscope), or a directional bridge or coupler, separating forward- from reverse-traveling waves.

DETAILED DESCRIPTION OF THE INVENTION

Figure 1:
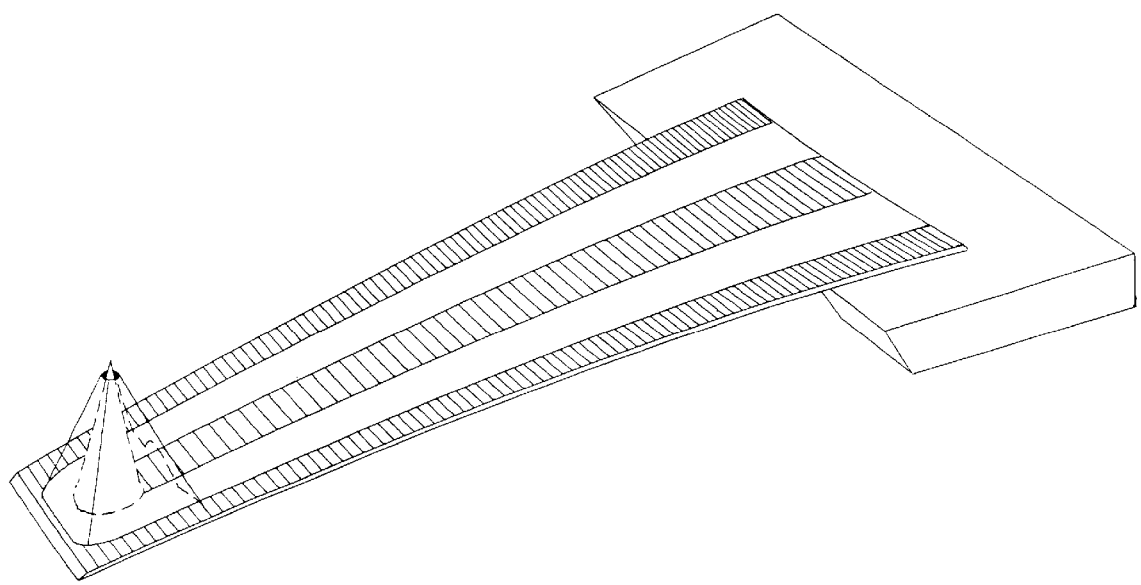
FIG. 1 is an oblique view of a preferred embodiment of the invention.

FIG. 1 is a perspective view from the underside of one preferred embodiment according to the present invention, showing a combined near-field coaxial probe tip antenna having a sub-wavelength aperture and an SPM probe tip, as well as a broadband transmission line structure leading from the combined tip along an SPM cantilever to the root or support of the cantilever, where contact can be made to instrumentation, whether conventional measurement or generation instrumentation, instrumentation integrated on the cantilever support, or some combination of the two. While it has been omitted for clarity, a substantially half-cylindrical or tunnel-like shield can be arranged along the length of the cantilever to prevent interference from extraneous fields emanating from the sample.

Combined Electromagnetic Field and Topography SPM Apparatus

Figure 2:
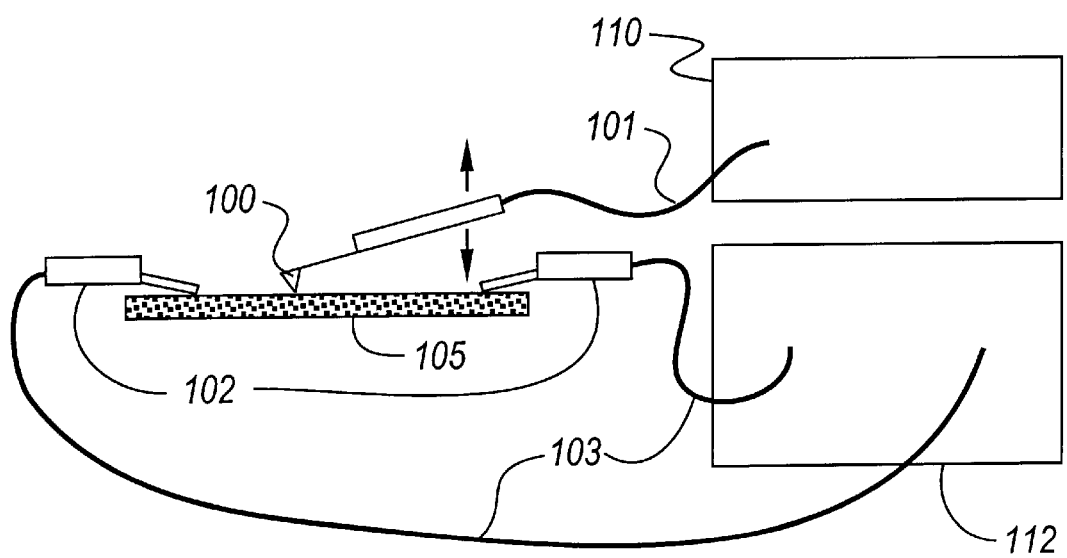
FIG. 2 depicts the essential components of a system using the invention for scanning electromagnetic field properties of a sample at frequencies suitable for electronic generation and/or detection of signals.

FIG. 2 is a conceptual diagram of the system as contemplated for using the probe of FIG. 1 to measure signals on samples such as active, possibly integrated, circuits, electrical and magnetic properties of surfaces, such as thin films or crystals, or any other similar measurement. While the present invention uses an SPM platform, including tip position control and recording of topography, details of SPM operation and topography acquisition, including the variety of scanning modes, such as contact, non-contact, periodic-contact, magnetic force, tunneling, etc., while all useful with the present invention, are not presented in detail here since they are wellknown in the art and described in several publications such as Rugar and Hansma, "Atomic force microscopy," Physics Today, 23–30 (1990) and references therein, as well as in U.S. Pat. No. 5,489,774 to Akamine, et al., both incorporated herein by reference. A benefit over the prior art in probing signals in the sub-visible portion of the spectrum at sub-micrometer resolution is, however, the precise tip-sample distance control afforded by an SPM platform, especially as it enhances accuracy of electromagnetic field measurements in the near-zone of the sub-wavelength antenna integrated onto an SPM cantilever, according to the present invention.

Using the present invention in a system as depicted in FIG. 2 for measurements on a sample 105 like those described above requires connecting the probe 100 to a suitable signal generation and/or measurement apparatus 110 by sufficiently broadband electrical means, one preferred example being a coaxial cable 101. The apparatus 110 could be comprised of one or more instruments, such as oscilloscopes, signal generators, network analyzers, microwave bridges, etc., some possibilities of which are discussed in Golosovsky, Galkin et al., "High-spatial resolution resistivity mapping of large-area YBCO films by a near-field millimeter-wave microscope," IEEE Transactions on Microwave Theory and Techniques, 44 1390–2 (1996), incorporated herein by reference, FIG. 2 also illustrates the use of auxiliary stimulus and measurement of the sample 105 using contact-type, possibly high-frequency probes, such as coplanar waveguide probes available from Cascade Microtech, Inc., 102 connected via cables 103 to suitable signal generation and/or measurement apparatus 112, as is commonly practiced in the art. One specific example of this application would be excitation and measurement of a high-frequency integrated circuit (HFIC) by the usual means of contact probing with probes 102 using a microwave network analyzer as the signal generation and/or measurement apparatus 112. In accordance with the present invention, signals internal to the HFIC could be excited and/or measured via the probe 100 by the apparatus 110, as well as the usual external-node measurements being made by the apparatus 112, a significant improvement over prior art for probing HFIC's. As is also commonly practiced in the art, an SPM platform controlling fine (generally less than 100 micrometer) movement of the probe 100 could also control gross (generally greater than 100 micrometer) movement of the sample 105 by means of a suitable stage and interface, not shown in FIG. 2 for clarity. Furthermore, as commonly practiced in the art, these elements of sample movement and topography measurement could be connected to a central controlling computer which also controlled and read data from the signal generation and/or detection apparatus 110 and 112.

Figure 3:
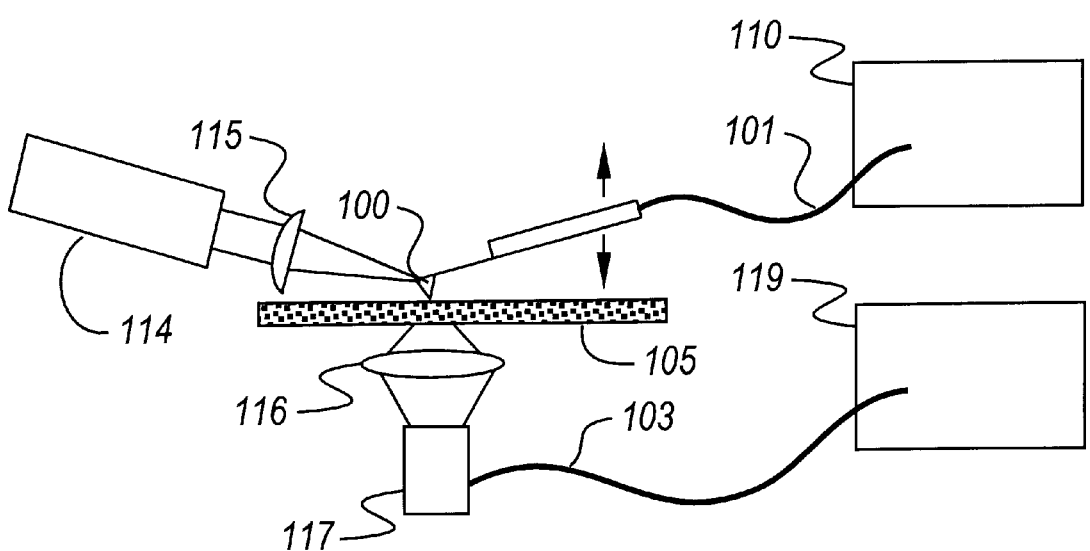
FIG. 3 depicts the essential components of a system using the invention for scanning electromagnetic field properties of a sample at frequencies generally higher than electronic generation permits, thus a laser excitation is employed.
Figure 8:
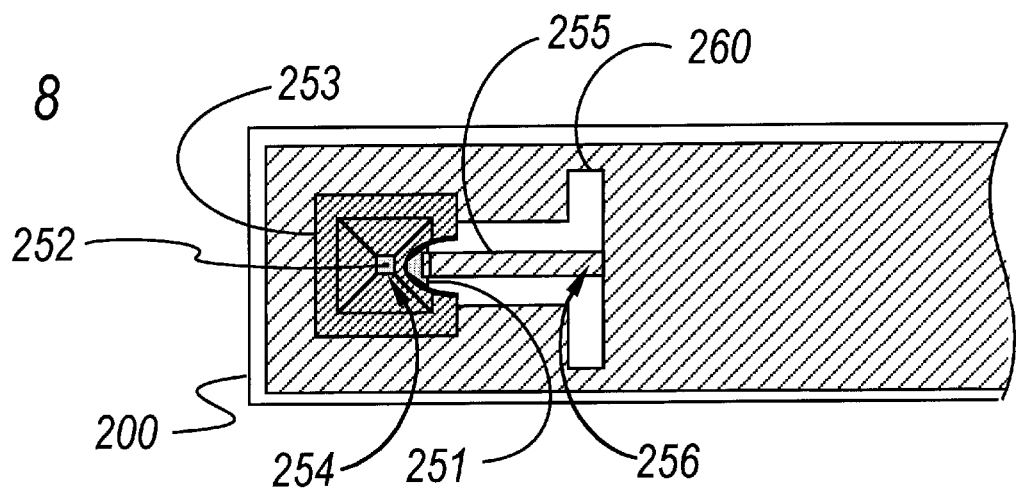
FIG. 8 shows the top view of the coaxial tip arrangement of FIG. 7 but excited by a resonant slot antenna in the plane of the SPM cantilever for use in the system depicted in FIG. 3.
Figure 9:
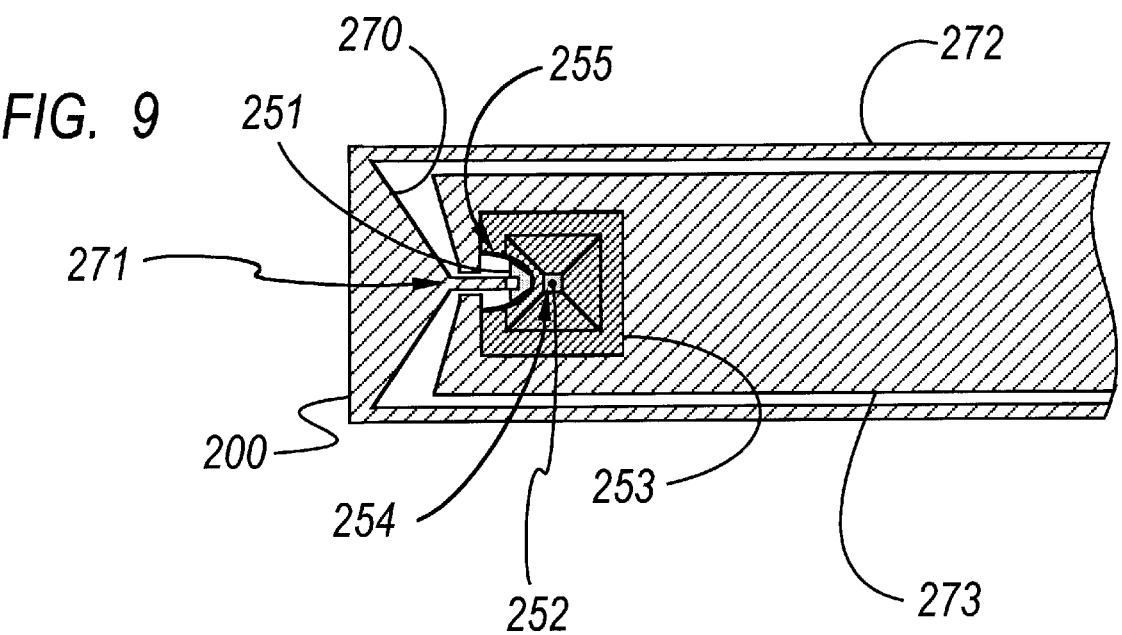
FIG. 9 shows the top view of the coaxial tip arrangement of FIG. 7 but excited by a broadband slot antenna in the plane of the SPM cantilever for use in the system depicted in FIG. 3.

Similarly, according to the present invention, FIG. 3 is a variant of the arrangement described above for FIG. 2. In FIG. 3, the contact-mode probing system has been replaced by a laser excitation, modulation, and detection system, though the present invention allows for all combinations of the above instrumentation as necessary for carrying out localized electromagnetic field measurements in the sub-visible portion of the spectrum. In FIG. 3, the probe 100 is excited by a quasi-optical source, such as a far-infrared (FIR) laser or a blackbody source and interferometer (as would be commonly found in a Fourier-transform infrared or FTIR spectrometer such as the Bruker 113-V), 114 whose freely-propagating radiation, if substantially collimated, is focused with a transmissive or reflective lens 115 onto the probe, which has a suitable resonant or broadband antenna structure integrated on it, as illustrated in FIGS. 8 and 9. The theory and practice of such planar FIR antenna structures are discussed in Rutledge, Schwarz et al., "Infrared and sub-millimeter antennas," Infrared Physics, 18 713–29 (1978), Wilke, Herrmann et al., "Integrated nanostrip dipole antennas for coherent 30 THz infrared radiation," Applied Physics B (Lasers and Optics), B58 87–95 (1994), and van der Weide, "Planar antennas for all-electronic terahertz systems," Journal of the Optical Society of America B (Optical Physics), 11 2553–60 (1994), all incorporated herein by reference. For localized transmission spectroscopy on a sample 105, which might be a cell membrane, thin film, or other suitable sample with contrast mechanisms in the sub-visible portion of the spectrum, a radiation detector 117 is located below the sample 105 and the transmitted radiation from a source 114, suitably modulated, is imaged onto a detector 117 by a lens 116 and/or filter if necessary. A detector 117 is connected a to suitable measurement apparatus 119, such as a lock-in amplifier, via a cable 103. Control of a probe 110 is accomplished in substantially the same manner as that described above for FIG. 2, and auxiliary measurements can also be made using apparatus 110, such as detecting a difference-frequency "beat note" or downconverted signal from a response of the sample, as is well-known in laser-based measurements. This type of measurement might require the use of two phase-synchronous sources 114, such as two cavity-locked lasers, so the depiction of only one source 114 in FIG. 3 should not be construed as restrictive. Reflection measurements could also be conducted, using detectors integrated with the probe, such as diodes, or auxiliary detectors sensing radiation scattered or emanating from the sample. Other detection optics and mechanisms not expressly illustrated here, such as photo-conductive responses of the sample measured through auxiliary probes as discussed in Balk, Koschinski et al., "Nano and micro characterization of III-V-compound material by dedicated scanning microscopy," Proceedings of the Symposium on Nondestructive Wafer Characterization for Compound Semiconductor Materials and the Twenty-Second State-of-the-Art Program on Compound Semiconductors (SOTAPOCS XXII), 39–54 (1995) or confocal detection optics as described in U.S. Pat. No. 5,581,082 to Hansma, et al., both incorporated herein by reference, are readily implemented in accordance with the present invention. It should also be noted that a detector 117 need not be located opposite a probe 100, and that a source 114 and detector 117 could be interchanged.

In the arrangements of both FIGS. 2 and 3, a probe 100 is depicted as scanning along a substantially motionless sample 105. This depiction is not to be taken as restrictive, and in accordance with the present invention, the sample could be mounted onto a cantilever and the combined probe held substantially fixed, with most of the benefits of the present invention still realized.

Probe and Tip Assembly

While not intended to be restrictive, the rest of the figures depict a variety of combined electromagnetic field and topography probes to illustrate the general nature of the present invention. One or a plurality of electromagnetic field antennas is integrated onto one or even a plurality of SPM cantilevers having suitable mechanical probe tips for sensing sample topography and also maintaining a controlled tip-sample separation for accurate near-zone electromagnetic field measurements.

Figure 4:
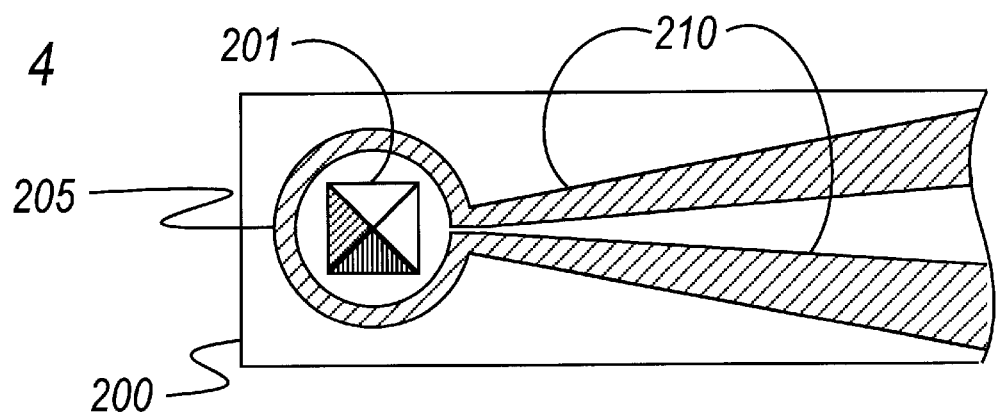
FIG. 4 shows the top view of one embodiment of the invention combining a pyramidal topography probe with a magnetic-field loop antenna in the plane of the SPM cantilever.

In FIG. 4, a pyramidal topography probe is situated at the end of a SPM cantilever, as is commonly practiced in the art. Such probes are commercially available from vendors such as Park Scientific, Inc., Topometrix, Inc., and Digital Instruments, Inc., and, depending on their application, are made from single-crystal silicon or silicon nitride, though metallic probes are known and the present invention does not limit use or modification of SPM probes on the basis of material. Therefore, the probe of FIG. 4 and the following variants in FIGS. 5–9 could be batch-fabricated or modified from existing topographical or other probes according to the present invention. One process for batch-fabricating probes of potentially similar construction but for a different purpose, a visible-light near-field scanning optical microscope (NSOM), is described in U.S. Pat. No. 5,354,985 to Quate, incorporated herein by reference. In another embodiment, FIG. 4 depicts a small-diameter loop antenna 205, having a diameter generally less than 10 micrometers, surrounding a topographical probe tip 201 oriented normal to the plane of the SPM cantilever 200. Also provided is a balanced waveguide transmission line 210, which is suitably tapered and can be designed to have a characteristic impedance Zo to allow impedance matching to suitable high-frequency sources and/or detectors. Using the probe of FIG. 4 in the apparatus of FIG. 2 would enable simultaneous excitation and/or acquisition of high-frequency magnetic field components substantially normal to a sample 105.

If a conductive path is accessible on the sample, the present invention can be used not only to probe fields but also sample voltages when in conductive contact with the sample, especially useful for exciting and measuring sub-micrometer computational structures or low-dimensional electronic structures, such as so-called quantum dot systems. Furthermore, by controlling the tip-sample distance as is readily achieved with the SPM platform, the tip-sample capacitance can be varied continuously, enabling a trade-off between probe invasiveness (or "loading" of the circuit under test) and level of signal detected. This ability to vary tip-sample capacitance has another substantial benefit, according to the present invention, in that the low-frequency zero formed by the probe series resistance, radiation resistance and the tip-sample capacitance can be varied with tip-sample distance. Accordingly, by varying the frequency of this zero, an estimate or extrapolation of the DC value of the voltage on a conductor can be made without requiring actual conductive contact to the sample. This is a substantial improvement over the prior art of measuring AC voltages on integrated circuit conductors with secondary electrons from a modified scanning electron microscope, as is currently practiced in the industry.

Figure 5:
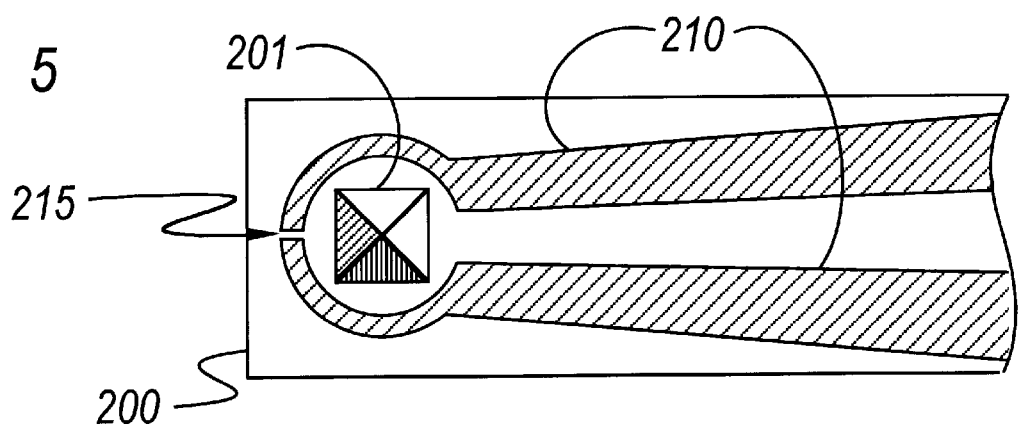
FIG. 5 shows the top view of one embodiment of the invention combining a pyramidal topography probe with an electric-field gap antenna in the plane of the SPM cantilever.

FIG. 5 depicts a geometry substantially similar to that of FIG. 4, but with an electric-field gap antenna, which substantially measures or excites high-frequency electric fields in the plane of the SPM cantilever which are polarized normal to the length of the gap, this length being generally less than 10 micrometers. As in FIG. 4, a suitable planar waveguide transmission line is provided, and its characteristic impedance can be designed to match the impedance of the antenna to that of the source and/or detector, if required.

As discussed above, while it has been omitted from the figure for clarity, a substantially half-cylindrical conducting shield can be incorporated onto the cantilever to minimize the coupling of extraneous fields from the sample or environment to the waveguide. The waveguide and antenna structures could also be fabricated on the opposite face of a cantilever 200 in accordance with the present invention.

Figure 6:
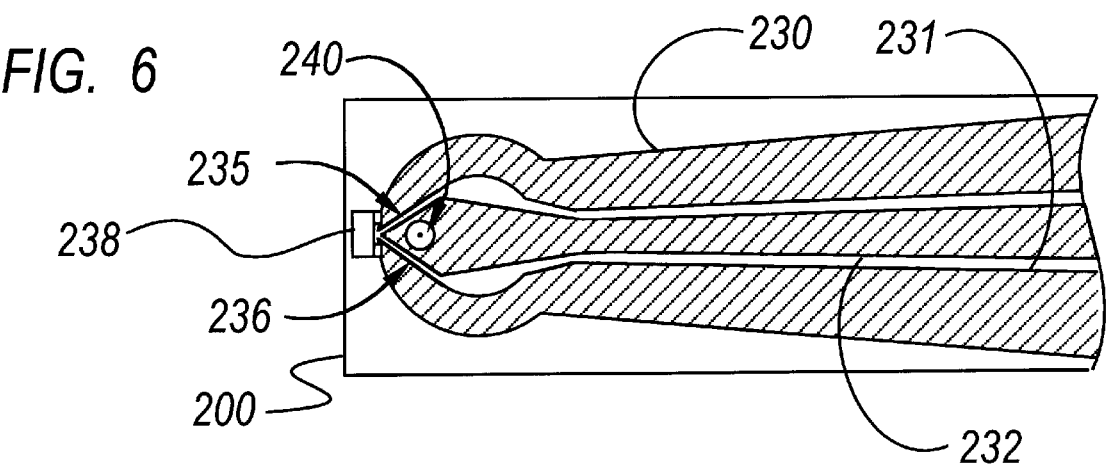
FIG. 6 shows the top view of one embodiment of the invention combining a conical topography probe with two orthogonal electric-field gap antennas in the plane of the SPM cantilever and a semiconductor switch to complete a magnetic-field loop antenna, also in the plane of the SPM cantilever.

A combination of the modes described for FIGS. 4 and 5 is illustrated in FIG. 6 to indicate the general nature of the present invention and the number of antenna combinations possible. Though not intended to be restrictive, FIG. 6 illustrates how three different high-frequency antennas can be combined onto the basic topography probe concept of FIGS. 4 and 5. Here, a topography probe 240 is depicted as a variation from earlier versions, being a conical probe, either grown by focused-ion-beam (FIB) techniques, attached as a separate diamond tip, or integrated as a hardened silicon tip according to U.S. Pat. No. 5,393,647 to Neukermans et al., incorporated herein by reference. In one embodiment, a small in-plane protrusion from the suitably-curved end of the cantilever opposite its support would also serve as a topography sensor, with greater ease of fabrication, albeit with reduced spatial resolution. Connected to this probe is a center conductor 232 integrated with an SPM cantilever 200 whose end is terminated in substantially orthogonal gap antennas 235 and 236, allowing simultaneous measurement of two electric field polarizations, a substantial benefit. Each gap antenna has a corresponding outer conductor or return conductor, 230 and 231. Furthermore, these return conductors can themselves be electrically connected at their tips by a suitable electronic switch 238 such as a PIN diode, commonly used in microwave-frequency circuits as a current-controlled high-frequency conductor. With a switch 238 closed, current can flow around the resulting loop through conductors 230 and 231, enabling a magnetic-field measurement in substantially the same mode as the probe of FIG. 4. Multiple connectors and cables or several integrated instruments, as well as DC isolation, would be required at the root of the cantilever to implement the three-field measurement capabilities illustrated in the probe of FIG. 6, but benefits would be realized from simultaneous acquisition or excitation of these three field components as well as sample topography, a substantial improvement over the prior art.

The fabrication sequence for these substantially in-plane embodiments of the present invention follows.
1. Grow 0.4–0.6 μm $SiO_2$ on a standard <100> silicon wafer
2. Deposit 1.5 μm silicon nitride ($Si_3N_4$)
3. Evaporate 200 nm Al
4. Lithography to define planar antenna patterns
5. $O_2$ Plasma descum
6. Etch Al in $H_3PO_4$
7. Strip photoresist
8. Cantilever ($Si_3N_4$) lithography using 2 μm photoresist
9. Etch $Si_3N_4$ and $SiO_2$
10. Strip remaining resist; clean wafer
11. Sinter Al in forming gas for 30 minutes at 450° C.
12. Perform backside lithography of cantilever ($Si_3N_4$) using 2 μm photoresist
13. Perform backside $Si_3N_4$ and $SiO_2$ etch
14. Strip remaining resist; clean wafer
15. Protect frontside of wafer by gluing to glass plate or use black wax
16. Perform backside etch in TMAH doped with silicon until 20 μm of silicon is left
17. Remove wafer from glass or remove black wax
18. Coat frontside of wafer with ~5 μm photoresist
19. Perform backside silicon etch in either $SF_6/O_2$ or $XeF_2$
20. $SiO_2$ etch in BOE The benefits of multiple antennas extend to applications in which the same field component should be measured at different positions simultaneously, and these benefits are in accordance with the present invention. Specifically, an arrangement of several spatially-separated field probes allows interferometric measurements, hence acquisition of field profiles with higher resolution than that of a single antenna, using suitable signal processing techniques already practiced in the art, for example, in radio astronomy or synthetic aperture radar. Higher spatial resolution of field components from interferometric measurements using spatially separated antennas is a well-known benefit at these larger length scales, although such measurements have not been practiced at the micro- and sub-micrometer scales contemplated in the present invention since there has not been a suitable instrument outside of that described here. Multiple antennas could be achieved either with several antennas on the same cantilever, single antennas on multiple cantilevers, or a suitable combination of the two approaches, according to the present invention. A discussion of such parallel arrays of cantilevers and a fabrication sequence is given in Indermühle, Schürmann et al., "Self-sharpening tip integrated on micro cantilevers with self-exciting piezoelectric sensor for parallel atomic force microscopy," Applied Physics Letters, 70 2318–20 (1997).

Figure 7:
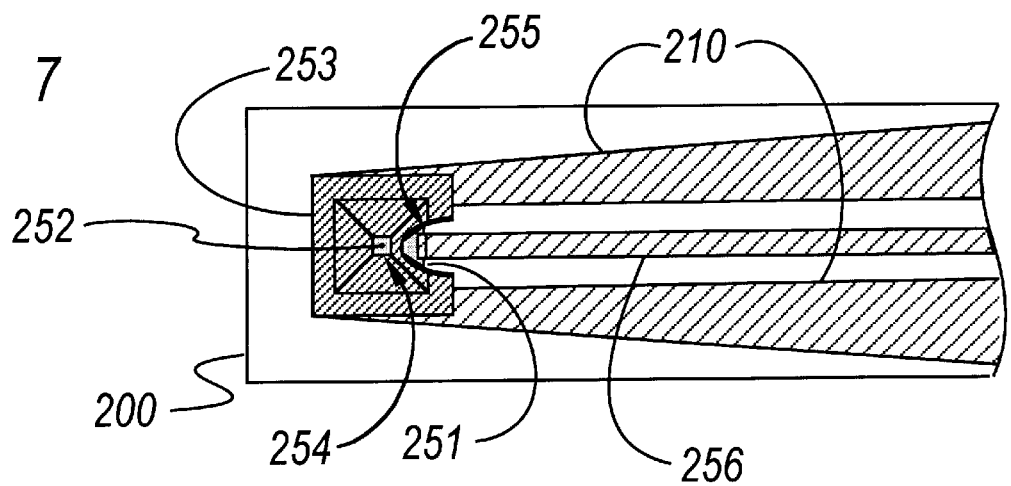
FIG. 7 shows the top view of the preferred embodiment of the invention combining a pyramidal topography probe with an electric-field coaxial antenna concentric with the SPM probe tip.

A preferred embodiment of the present invention is depicted in FIG. 7, in which substantially higher spatial resolution of electric fields can be achieved over the antennas described in FIGS. 5 and 6. Here, as previously illustrated in FIG. 1, a broadband waveguide transmission line, specifically coplanar waveguide, a quasi-TEM (transverse electromagnetic) structure having symmetrical ground conductors 210 and a center conductor 256, feeds or is excited by a coaxial antenna structure integrated with an SPM cantilever 200. The combined field and topography-probing capabilities of this coaxial structure form the essence of the present invention, since a pyramidal or conical center conductor 251 of a coaxial antenna is terminated in a sharp tip 252 which serves as a topography sensing element in a scanning probe microscope. A center conductor 256 is electrically common with a tip center conductor 251, so to avoid electrically shorting this connection to an outer shield of the coaxial antenna 253, a small tunnel 255 or other isolating means, such as routing the center conductor on the opposite side of a cantilever 200, is employed. A shield 253 is depicted in FIG. 7 as being local to a center conductor 251, although the present invention can accommodate an extended shield running along the cantilever back to the root (opposite the tip), further isolating the field measurement and reducing interference, a substantial benefit over the prior art. A small opening 254 in a shield at a tip 252 allows the present invention to maintain tip-shield isolation and controlled characteristic impedance up to the region of measurement, also a substantial improvement over the prior art. Furthermore, the potential of a shield can itself be excited or measured either for canceling undesired shield-sample electrostatic or electrodynamic interactions, or for making differential measurements, especially if a third shield is introduced along the cantilever in a triaxial arrangement for maximum suppression of interference, according to the present invention.

In FIG. 8, substantially the same coaxial shield 253 and combined field/topography-probing center conductor 251 as in FIG. 7 is excited instead by a resonant planar slot antenna 260 which is connected to the tip via a transition 256 to a center conductor 255. Substantially the same fabrication techniques used for the tip in FIG. 7 are employed for the probe in FIG. 8, but with the benefits of free-space excitation from a suitable radiation source, such as a FIR laser or FTIR spectrometer. A probe such as that in FIG. 8 would be used in the experimental arrangement of FIG. 3 if a single-frequency measurement with maximum efficiency were desired. Benefits of the same-side arrangement of both near- (251–254) and far-field 260 antennas on this probe include the effect of dielectric loading from the cantilever material, which serves to collect radiation more efficiently from the back side of the cantilever, especially if a substrate lens would be employed van der Weide, "Planar antennas for all-electronic terahertz systems," Journal of the Optical Society of America B (Optical Physics), 11 2553–60 (1994). Furthermore, a transition 256 could be replaced by a photoconductive switch with suitable modification of the conductor patterns of FIG. 8. In this case, local excitation of the sample could take place within a controlled-impedance environment, an improvement over the prior art described in U.S. Pat. No. 5,442,300 to Nees, et al., incorporated herein by reference.

Likewise in FIG. 9, the combination of near- and far-field antennas is again provided, however a substantially improved arrangement is shown. A tip and shield as in FIGS. 7 and 8 is now reoriented and fed from a tapered slot antenna 270 which coincides with the end of the dielectric slab forming an SPM cantilever 200. Details of the benefits of this antenna are given in Moussessian and Rutledge, "A millimeter-wave slot-V antenna," IEEE Antennas and Propagation Society International Symposium. 1992 Digest. Held in Conjuction with: URSI Radio Science Meeting and Nuclear EMP Meeting (Cat. No.92CH3178-1), 4 1894–7 (1992), incorporated herein by reference, but a shod description is provided here. A "slot-V" antenna 270 drives the center conductor of the tapered tip via transition 271, a portion of which in accordance with the present invention could be a photoconductor as described above. The dielectric loading of the slab (i.e. a cantilever 200) causes the main lobe of the E-field pattern of the slot-V antenna to be tilted out of the plane of the slab (cantilever) by a design- and material-dependent angle, which is elevated roughly 20 degrees out of the plane of 200 in the direction of the slab. Three distinct and important advantages accrue to this unique arrangement: first, incoming broadband excitation can be readily coupled into the cantilever at this angle, as depicted schematically in FIG. 3, thus requiring no turning mirrors or other awkward optical arrangements to excite the antenna; next, the broadband and single-lobe characteristics of this antenna lend themselves to use of a variety of wavelengths, especially the FTIR interferometer-blackbody combination described earlier; finally, the ability to make a controlled-impedance quasi-TEM connection to the root of the cantilever via outer conductor 272 and inner conductor 273 enables detection of beat-note downconverted signals, or biasing of the tip-shield gap for contact-mode probing, also in accordance with the present invention.

Figure 10:
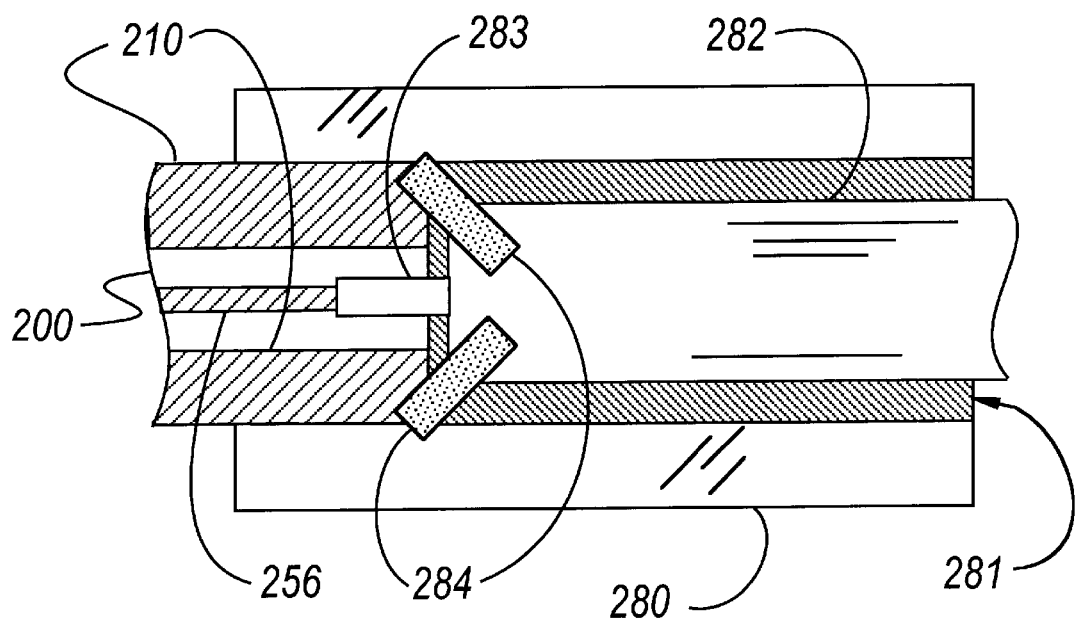
FIG. 10 depicts one embodiment of the SPM cantilever root, where the electrical and mechanical interface to the tip/cantilever designs of FIGS. 4–9 is made.

FIG. 10 shows one embodiment of a cantilever root electrical and mechanical interface between cantilevers in FIGS. 4–9 and the measurement and/or generation apparatus of the present invention. Here, a suitable cantilever support 280, such as glass, silicon, or another semiconductor, is relieved in a V-groove or other channel 281 to enable alignment of a coaxial cable jacket 282 and center conductor 283. This relief also enables the cable to be substantially flush-mounted in a cantilever support 280, allowing shallow-angle (less than 15 degrees from the plane of the sample) probing as is commonly practiced in SPM. The center conductor of a coaxial cable 283 is suitably attached to one conductor 256 of the planar waveguide transmission line running along an SPM cantilever 200, using conductive epoxy, thermocompression bonding, or other suitable means. A jacket 282 is electrically connected to a return conductor(s) 210 of the same planar waveguide transmission line running along an SPM cantilever 200 using conductive epoxy, thermocompression bonding, metallic strips 284, or other suitable means.

While FIG. 10 illustrates one embodiment of the electrical-mechanical interface, the best mode according to the current invention is to integrate local instruments at the root of a cantilever onto the cantilever support material, generally silicon, although other semiconductors, such as gallium arsenide, can alternatively be used. Advantages of local instrumentation for signal generation, amplification and/or detection include much lower losses and noise, wider bandwidths, and ability to use thinner interconnection cables to external instruments, since signal loss becomes less critical. Use of an extremely wide variety of instruments, including fast-signal generation circuits such as nonlinear transmission lines, as in van der Weide, "Localized picosecond resolution with a near-field microwave/scanning-force microscope," Applied Physics Letters, 70 677–79 (1997), diode sampling bridges, low-noise amplifiers, and oscillators is commonly practiced in the art; its combination with the multifunctional scanning near-field tip described here is a unique feature of the present invention.

Tip Fabricaation

In FIG. 11, a simple sequence for realizing the best mode of the present invention is presented, based upon van der Weide, "Localized picosecond resolution with a near-field microwave/scanning-force microscope," Applied Physics Letters, 70 677–79 (1997), incorporated herein by reference, while in FIG. 12, a scanning electron micrograph shows the coaxial structure realized through modification of an existing cantilever. Techniques for obtaining coaxial structures on SPM tips, usually fabricated using single-crystal silicon, are known in the art. In Davis, Williams et al., "Micromachined submicrometer photodiode for scanning probe microscopy," Applied Physics Letters, 66 2309–11 (1995), van der Weide and Neuzil, "The nanoscilloscope: Combined topography and AC field probing with a micromachined tip," Journal of Vacuum Science & Technology B (Microelectronics and Nanometer Structures), 14 4144–7 (1996) and Noell, Abraham et al., "Micromachined aperture probe tip for multifunctional scanning probe microscopy," Applied Physics Letters, 70 1236–38 (1997), all incorporated herein by reference, a process is described for obtaining SPM tips with isolated conducting shields and ~100 nanometer diameter openings at the tip. In most cases, this process has been developed for obtaining diode structures, wherein a P-type tip forms a junction with an N-type shield close to the tip end so that a photodetector can be realized. A trivial modification of this process, less etching of the $SiO_2$ insulator, leads to a completely isolated center and outer conductor. Whether working from an existing tip-cantilever assembly or batch fabricating the present invention, FIG. 11 illustrates the salient points of the process. In FIG. 11*a*, the side view of a cantilever 290 is shown with a pyramidal tip 291, although this tip can also be an evaporated metal cone, as described in U.S. Pat. No. 5,442,300 to Nees, et al., and references therein.

Figure 11A:
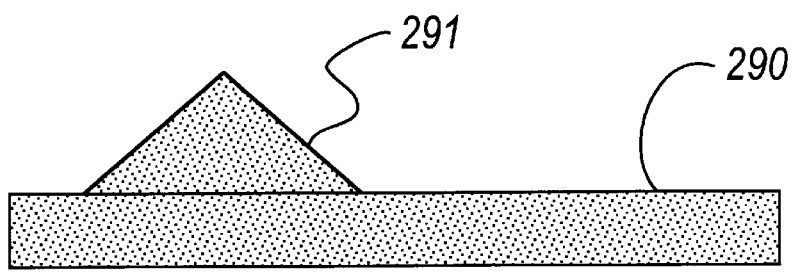
FIG. 11 illustrates the tip preparation sequence for the preferred embodiment of the invention giving a conical or pyramidal shielded tip as illustrated in FIGS. 7–9.
Figure 11B:
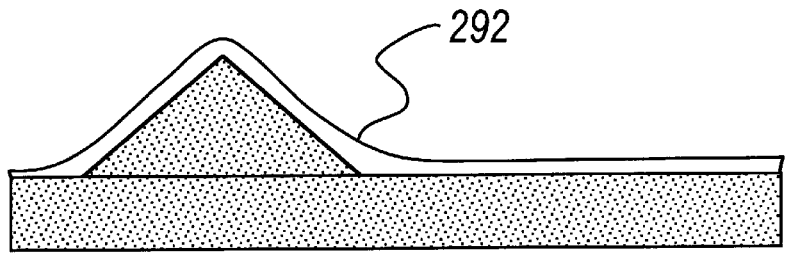

In FIG. 11*b*, a suitable dielectric insulator 292 has been applied to the tip. Depending on the mode of fabrication and tip material, this can be 0.1–5 $\mu$m of a suitable material such as photoresist, a polyamide, or $SiO_2$, deposition of which is well-known in the art and described in detail in U.S. Pat. No. 5,354,985 to Quate and references therein. As discussed in this reference, the thickness of the material is highly dependent on the choice of material and deposition technique, but in the present example, for photoresist applied via a brush hair, it can be greater than 3 micrometers, a substantial advantage for making a high Zo waveguide along the cantilever. The variation of thickness in layer 292 as depicted in FIG. 11*b* serves to indicate this possibility, depending on the means of layer deposition, and is not to be restrictive.

Thus, the thickness of one or more dielectric layers 292 and the dielectric constant of the chosen materials can be varied to achieve a range of characteristic impedances Zo for the waveguide transmission line. Such variation is a design parameter dependent on the Zo value of the instrumentation attached to the probe. The ability to control Zo from the instrumentation up to the probe tip is an advantage of the present invention over the prior art.

Figure 11C:
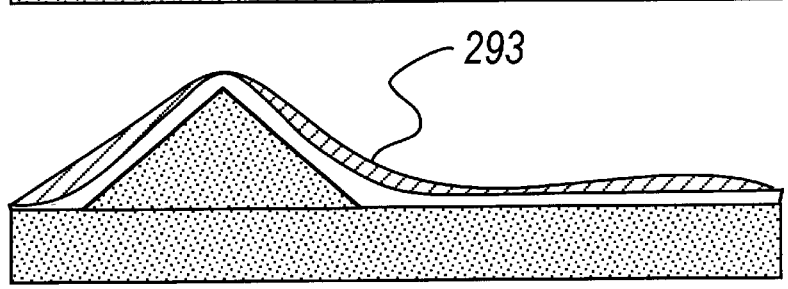
Figure 11D:
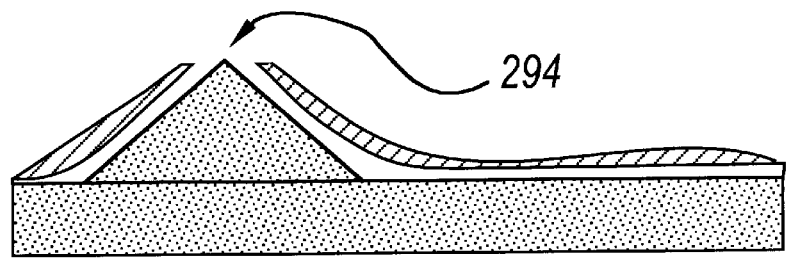

In FIG. 11*c*, second conductors 293 of either metal or conducting polycrystalline material such as polysilicon, are applied at a thickness of generally less than 0.5 $\mu$m so as to avoid induced stress on cantilever 290, which results in curling of the cantilever and renders it useless. FIG. 11*d* shows the final step of opening the shield formed around a tip, either by spinning photoresist so as not to completely cover the tip, then etching the metal through the resultant opening in photoresist, as described in the above references, or, in the case of single-tip modifications, gentle scraping of a tip against a sample while the tip is mounted in the SPM. Either technique reveals a coaxial opening useful for localized probing according to the present invention. FIG. 12 illustrates the tip-opening effect for the latter case, wherein a single-crystal silicon tip, commercially available as a non-contact SPM tip from Topometrix, Inc., is prepared with the following steps:

1. 90 degrees Celsius pre-bake for 90 minutes;
2. One drop of filtered HMDS adhesion promoter applied via pipette to the cantilever;
3. Air dry for 2 minutes;
4. One drop of AZ-5214E photoresist applied using a brush fiber to the cantilever and partially onto the cantilever support;
5. 120 degrees Celsius "hard bake" for 30 minutes;
6. Mount the cantilever in an electron-beam evaporator with the tip facing the metal source;
7. Evaporate 300 Angstroms of titanium at 8 Angstroms per second;
8. Evaporate 2000 Angstroms of gold at 4–6 Angstroms per second;
9. Remove from evaporator and mount tip-up on a micromanipulator stage;
10. Using a sharp-tipped tool, gently scrape excess gold and titanium from the cantilever support, except for a ~1 millimeter square region immediately at the base of the cantilever;
11. Anchor a ~50 millimeter length of suitably small coaxial cable (outer diameter generally less than 0.86 millimeters) onto the cantilever support using conductive (silver) epoxy;
12. Cure the epoxy according to manufacturer's directions;
13. Anchor a 18 micrometer diameter gold wire (e.g. a bond wire) to the metallic shield of the cantilever at its root using silver epoxy in the manner described above;
14. Attach the gold bond wire to the center conductor of the coaxial cable again using silver epoxy in the manner described above;
15. Connect the opposite end of the small coaxial cable to a larger cable with a suitable connector or by other means.

Figure 12A:
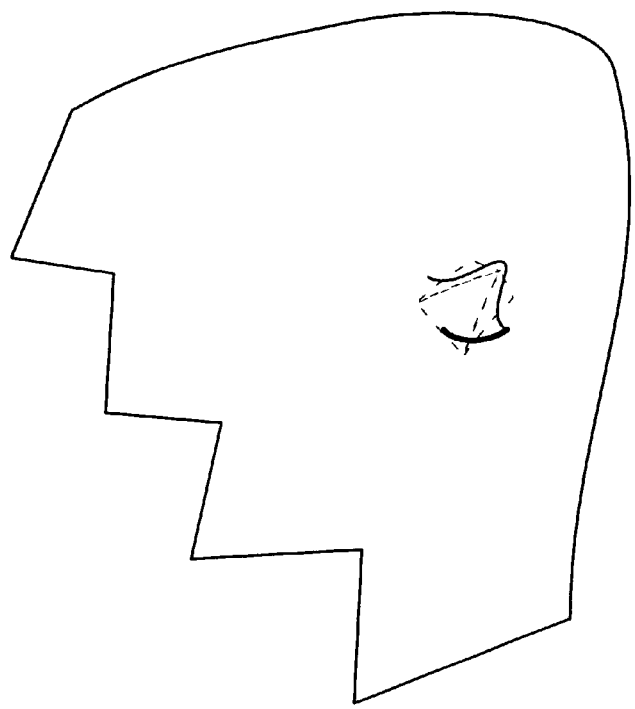
FIG. 12 shows one embodiment of the invention using a modified commercially-available single-crystal silicon SPM probe.
Figure 12B:
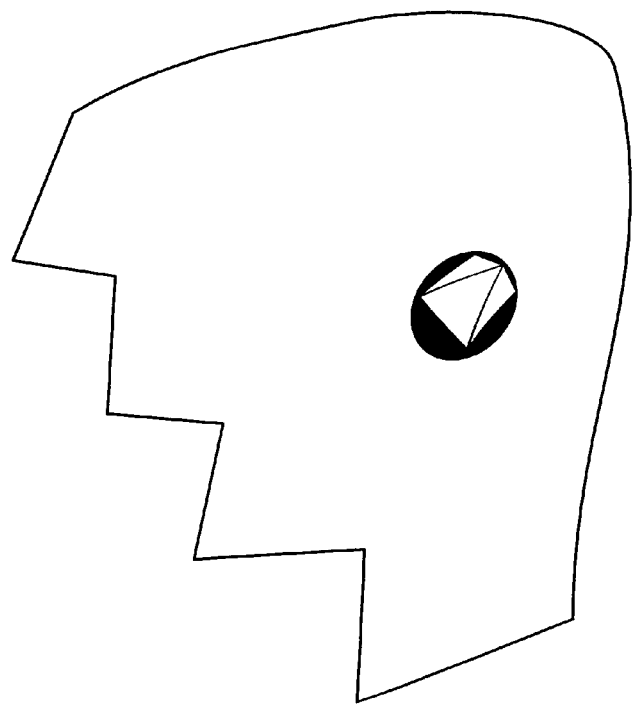

In FIG. 12a, a tip is shown with a contiguous metal shield immediately after evaporation. A tip is then mounted in an SPM after a coaxial cable is attached both to the shield metal and to the silicon cantilever support, which is electrically common with a tip-cantilever assembly. The resistance between tip and shield is monitored using a standard ohmmeter, and an SPM is put into "line scan" mode. As the tip is brought closer and closer to a sample, such as a gold thin film, eventually the end of the metal shield shears off and the resistance drops to very near zero ohms. FIG. 12b shows a resultant tip structure, wherein a coaxial arrangement is clearly seen.

Figure 13:
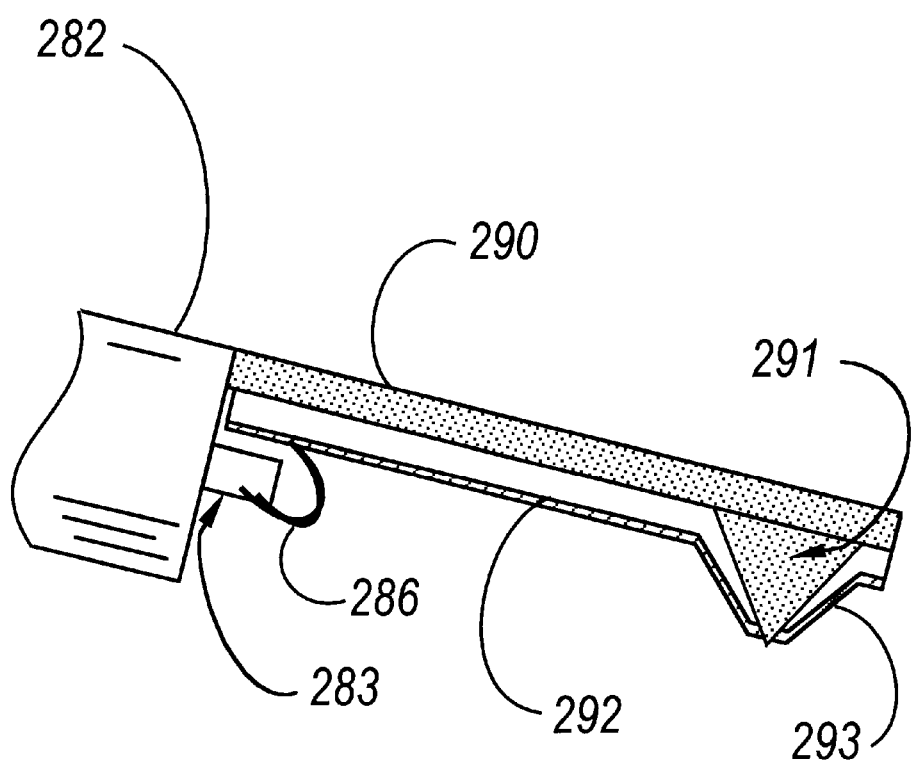
FIG. 13 shows scanning electron microscope images illustrating details of the probe in FIG. 12 during preparation.
Figure 14:
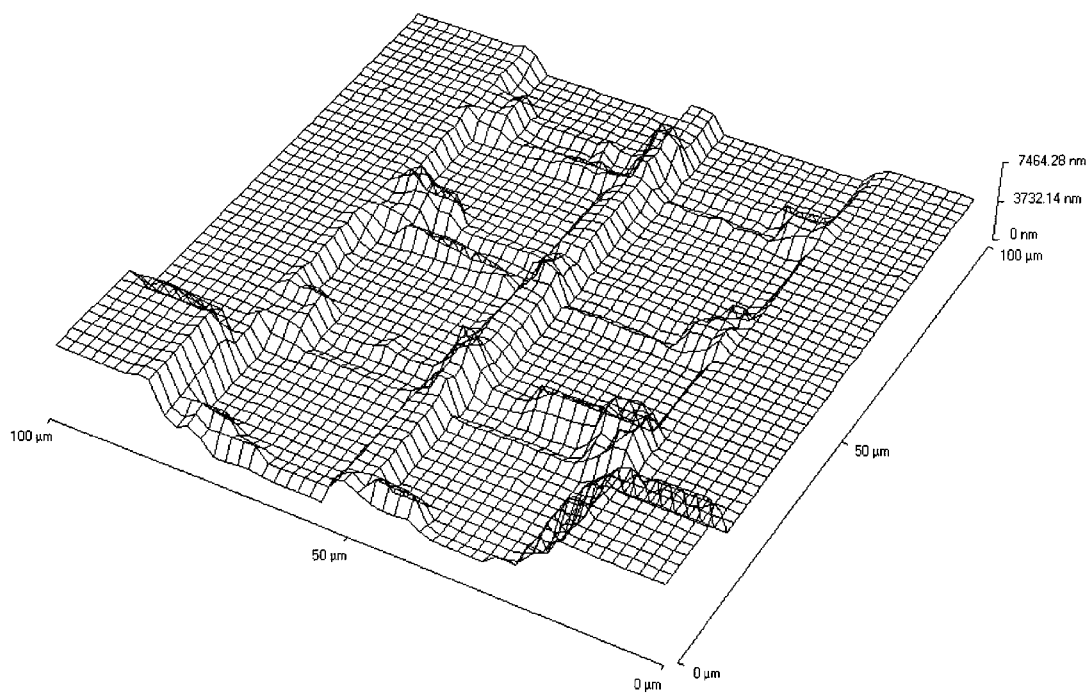
FIG. 14 is the topography of a circuit measured with the probe of FIG. 12.
Figure 15:
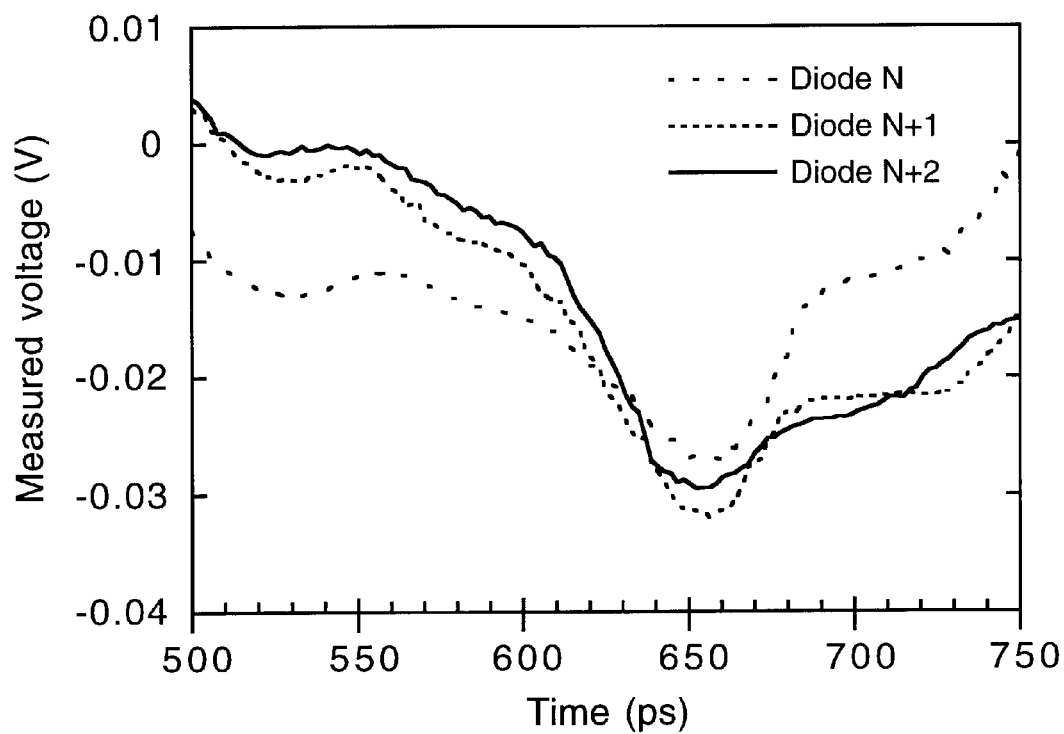
FIG. 15 is the local time-domain voltage measured on the circuit of FIG. 14 using the probe of FIG. 12.

In FIG. 13, a side-view cut-away diagram of a coaxial cable connection to a tip of the previous two figures is given, with a bond wire 286 shown. In FIG. 14, a non-contact topographical image of an integrated circuit sample is presented, taken with a tip like that of FIG. 12. Using the arrangement of FIG. 2 and a tip of the present invention, electrical waveforms on the sample of FIG. 14 can be measured using a sampling oscilloscope with a 50 GHz bandwidth. Clear distinctions in the waveforms at various positions along an active sample (at different diodes along a nonlinear transmission line designed to compress a falling-edge voltage waveform) indicate that high spatial resolution of the electric field of the present invention is achievable. Measurable changes in the waveforms were seen at less than 100 nanometer movements of the probe, indicating that high field and topographical resolution of the present invention are achievable. Furthermore, the limit on the bandwidth of the signal measured is found to be set by the capacitance of the large cable connecting the probe to the measurement instrumentation, and is not inherent in the probe itself. The upper limit to the frequencies measurable by the probe of the present invention in its best mode with local instrumentation integrated at the base of the cantilever will be set either by the bandwidth of said instrumentation or by the conductivity limits of the materials and lithographic and design limits used for the probe, generally below 30 THz.

The above process is not set forth as restrictive in the present invention; there are a number of alternative probes, metals and process steps which could arrive at substantially the same structure in accordance with the present invention. These will be obvious to one skilled in the art, and the broad principles of this invention are intended to include all such alternative embodiments. Furthermore, there exists a wide variety of cantilever deflection detecting techniques, including piezoresistive cantilevers, capacitive sensing plates, interferometric sensors, laser reflection sensing, and tunneling, all of which are discussed in the previously-incorporated reference U.S. Pat. No. 5,354,985 to Quate. What has been described is a unique but general combination of a topography-sensing element and one or a plurality of antennas for sensing or exciting near-zone electromagnetic fields in the sub-visible portion of the spectrum.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A combined probe tip and cantilever capable of measuring topography and near zone electromagnetic fields within the sub-visible portion of the spectrum, comprising:
   a flexible cantilever member having a free end and a fixed end,
   a tip formed near the free end of the cantilever member;
   a sub-wavelength planar antenna proximal to the tip;
   a controlled impedance waveguide along the cantilever connected to the sub-wavelength planar antenna.

2. The tip and cantilever of claim 1 wherein these are made from a single crystal of conducting or semiconducting material with an insulating layer surrounding the body of the tip and the apex left exposed, and a conducting shield surrounding the tip and some portion or substantially the whole of the cantilever with an aperture in the shape of a conic section defined in this shield at the tip apex, resulting in a open-terminated substantially coaxial structure.

3. The tip and cantilever of claim 2 wherein the tip is made electrically more conductive than the cantilever.

4. The tip and cantilever of claim 3 wherein the tip is connected to a conductor of a waveguide which is electrically isolated from the shield connected to other conductor(s) of the waveguide.

5. The tip and cantilever of claim 2 wherein the cantilever forms one conductor of the waveguide and the shield surrounding the tip is electrically common with another conductor of the waveguide.

6. The tip and cantilever of claim 4 further including instrumentation for generating or detecting sub-visible electromagnetic signals.

7. The assembly of claim 6 wherein the instrumentation is substantially integrated with the cantilever or cantilever support.

8. The assembly of claim 6 wherein the instrumentation is external to the cantilever.

9. The tip and cantilever of claim 4 further including an antenna for transducing freely-propagating or guided sub-visible electromagnetic signals.

10. The tip and cantilever of claim 1 wherein these are made from a non-crystalline, polycrystalline, or metallic material.

11. The assembly of claim 1 wherein the cantilever comprises a piezoresistive effect for detecting deflection of the cantilever.

12. The assembly of claim 1 wherein the cantilever comprises a capacitive plate for detecting deflection of the cantilever.

13. The assembly of claim 1 wherein the tip is made from a magnetic material to deflect the cantilever using magnetic forces.

14. An apparatus for producing scanning microscope topography and sub-visible electromagnetic field measurement images, comprising:
- a combined topography and scanning electromagnetic field probe tip and cantilever, including a near-field antenna having a substantially sub-wavelength aperture,
- a scanning probe microscope platform with controller, tip movement apparatus to measure topography and to maintain or adjust tip-sample separation, and display capabilities;
- a suitable stage for the sample, which allows the sub-visible radiation to pass through;
- one or a plurality of detectors for the sub-visible radiation in reflection or transmission from the sample.

15. The apparatus of claim 14 wherein the source of sub-visible radiation is one or a plurality of far-infrared lasers.

16. The apparatus of claim 14 wherein the source of sub-visible radiation is a Fourier-transform infrared spectrometer.

17. The apparatus of claim 14 wherein the source of sub-visible radiation is a photoconductor.

18. The apparatus of claim 14 wherein the source of sub-visible radiation is a nonlinear transmission line.

19. The apparatus of claim 14 wherein the source of sub-visible radiation is a microwave oscillator.

20. The apparatus of claim 14 wherein the detector of sub-visible radiation is one or a plurality of diodes.

21. The apparatus of claim 14 wherein the detector of sub-visible radiation is one or a plurality of bolometers.

22. The apparatus of claim 14 wherein the detector of sub-visible radiation is one or a plurality of quantum interference devices.

23. The apparatus of claim 14 wherein the detector of sub-visible radiation is a microwave bridge.

24. The apparatus of claim 14 wherein the detector of sub-visible radiation is one or a plurality of amplifiers.

25. The apparatus of claim 14 further including a resonator and detector.

26. The apparatus of claim 14 wherein the tip-sample distance is modulated so as to change the coupling capacitance between them.

27. The apparatus of claim 26 wherein the modulation serves to increase sensitivity or field resolution.

28. The apparatus of claim 26 wherein the modulation serves to enable measurement or estimation of static or low-frequency field values.

* * * * *